(12) United States Patent
Cahill et al.

(10) Patent No.: US 8,060,891 B2
(45) Date of Patent: Nov. 15, 2011

(54) MANAGEMENT OF EXTERNAL HARDWARE APPLIANCES IN A DISTRIBUTED OPERATING SYSTEM

(75) Inventors: Jason M. Cahill, Woodinville, WA (US); Titus C. Miron, Seattle, WA (US); Zachary D. Rosenfield, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/771,631

(22) Filed: Jun. 29, 2007

(65) Prior Publication Data
US 2009/0007152 A1 Jan. 1, 2009

(51) Int. Cl.
*G06F 3/00* (2006.01)
*G06F 15/173* (2006.01)
(52) U.S. Cl. .................................. 719/327; 709/233
(58) Field of Classification Search .............. 719/321, 719/327; 709/223
See application file for complete search history.

(56) References Cited

U.S. PATENT DOCUMENTS

| | | | |
|---|---|---|---|
| 5,778,349 A * | 7/1998 | Okonogi .................... 1/1 |
| 6,047,323 A | 4/2000 | Krause |
| 6,202,092 B1 * | 3/2001 | Takimoto .................... 709/225 |
| 6,556,995 B1 * | 4/2003 | Child et al. .................... 1/1 |
| 6,587,874 B1 | 7/2003 | Golla et al. |
| 6,757,745 B1 | 6/2004 | Hamann et al. |
| 6,880,158 B1 * | 4/2005 | Basso et al. .................... 719/321 |
| 6,895,438 B1 * | 5/2005 | Ulrich .................... 709/227 |
| 7,184,917 B2 | 2/2007 | Pramanick et al. |
| 7,565,422 B2 * | 7/2009 | Campbell et al. ............. 709/223 |
| 2003/0182397 A1 * | 9/2003 | Mitra et al. .................... 709/218 |
| 2003/0221094 A1 | 11/2003 | Pennarun |
| 2004/0049509 A1 | 3/2004 | Keller et al. |
| 2004/0230416 A1 | 11/2004 | Ye et al. |
| 2005/0108369 A1 | 5/2005 | Sather et al. |
| 2005/0125486 A1 | 6/2005 | Chrysanthakopoulos et al. |
| 2006/0047946 A1 | 3/2006 | Keith, Jr. |
| 2006/0165040 A1 | 7/2006 | Rathod et al. |
| 2007/0083679 A1 | 4/2007 | Kikuchi |
| 2008/0064501 A1 * | 3/2008 | Patel .............................. 463/40 |

FOREIGN PATENT DOCUMENTS

| | | |
|---|---|---|
| CN | 1761942 A | 4/2006 |
| WO | WO 9853578 | 11/1998 |
| WO | WO 2004/053688 A2 | 6/2004 |
| WO | 2008/067816 ISR | 1/2009 |

OTHER PUBLICATIONS

Andrej Bieszczad, Mobile Agents on Network Management, 1998.*
"Reliable Management of Distributed Computations in Nexus", A.Tripathi, S. Koneru, C. Nock, R. Tewari, N. Karnik, V. Bandi, K. Day, T. Noonan, Department of Computer Science, University of Minnesota, Minneapolis, MN, 8 pages.
"The V Distributed System", D. Cheriton, Communications of the ACM, Mar. 1988, vol. 31, No. 3, pp. 314-333.

* cited by examiner

*Primary Examiner* — Lechi Truong
(74) *Attorney, Agent, or Firm* — Merchant & Gould

(57) ABSTRACT

Embodiments are provided to manage external hardware appliances from a distributed operating system interface in a computer network using a driver model to communicate with device drivers associated with the external hardware appliances. In one embodiment, a request to manage an external hardware appliance in the computer network may be received in a distributed web-based operating system interface. A driver model may be selected which is configured to interface with a device driver for managing configuration settings for the external hardware appliance. The driver model may be utilized to manage the external hardware appliance configuration settings from the interface. The settings may include managing domain name changes, firewall settings, proxy settings, and the like. In another embodiment, the driver model may be utilized to manage external hardware appliance settings during a network configuration operation initiated from the distributed operating system interface.

16 Claims, 5 Drawing Sheets

MANAGEMENT OF EXTERNAL HARDWARE APPLIANCES IN A DISTRIBUTED OPERATING SYSTEM

BACKGROUND

Many computer networks include a shared infrastructure of multiple computers for providing resources to end users via a single web-based interface. These computer networks typically include a distributed operating system application for controlling a server farm as a single logical unit. The server farm typically includes stateless front end servers, application servers, and a database backend for storing user-created content as well as settings and connections between the front end servers and the application servers. Distributed operating system computer networks also typically include additional network hardware devices or appliances such as domain name system servers, firewalls, load balancers, wide area network accelerators, and proxy servers which are utilized by the server farm to increase security, provide high availability, or help manage network downtime.

The aforementioned additional network hardware appliances, however, are decentralized with respect to the distributed operating system (i.e., they are external devices with no visibility as to their status or configuration from within the distributed operating system). Furthermore, each network hardware appliance (even those manufactured by the same vendor) may have unique settings which must be manually configured by network engineers. Moreover, failures occurring within any external hardware appliance which may degrade or even crash the distributed operating system are invisible to a system administrator (the administrator may detect a failure has occurred but has no way of identifying the specific external hardware appliance or appliances causing the failure or determining the reason for the failure). As a result, time and resources are often wasted while network engineers are dispatched to identify and correct problems occurring in the external appliances. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to manage external hardware appliances from a distributed operating system interface in a computer network using a driver model to communicate with device drivers associated with the external hardware appliances. In one embodiment, a request to manage an external hardware appliance in the computer network may be received in a distributed web-based operating system interface. A driver model may be selected which is configured to interface with a device driver for managing configuration settings for the external hardware appliance. The driver model may be utilized to manage the external hardware appliance configuration settings from the interface. The settings may include managing domain name changes, firewall settings, proxy settings, and the like. In another embodiment, the driver model may be utilized to manage external hardware appliance settings during a network configuration operation initiated from the distributed operating system interface.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided to manage external hardware appliances from a distributed operating system interface in a computer network using a driver model to communicate with device drivers associated with the external hardware appliances. In one embodiment, a request to manage an external hardware appliance in the computer network may be received in a distributed web-based operating system interface. A driver model may be selected which is configured to interface with a device driver for managing configuration settings for the external hardware appliance. The driver model may be utilized to manage the external hardware appliance configuration settings from the interface. The settings may include managing domain name changes, firewall settings, proxy settings, and the like. In another embodiment, the driver model may be utilized to manage external hardware appliance settings during a network configuration operation initiated from the distributed operating system interface.

Figure 1:
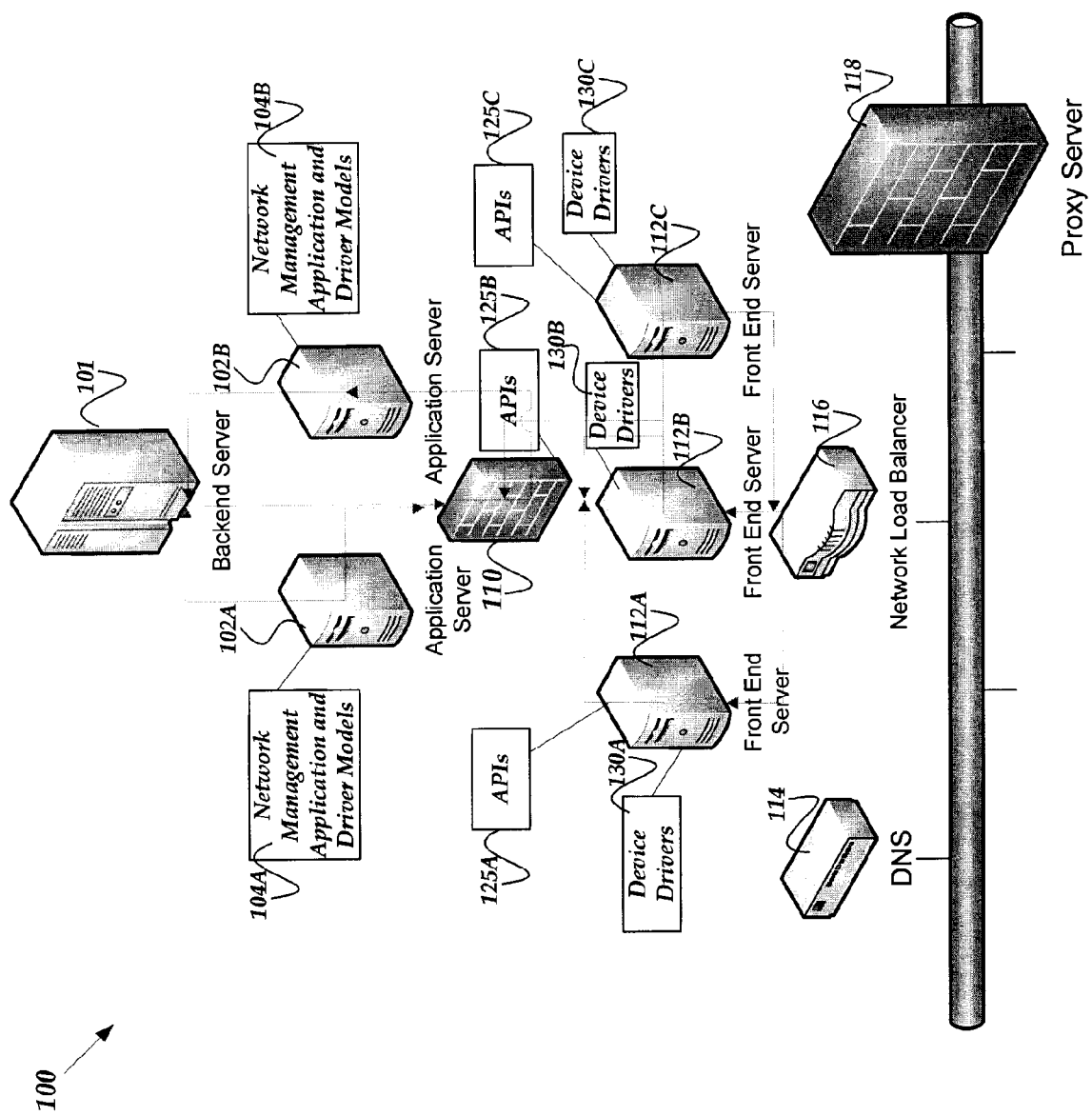
FIG. 1 is a network architecture diagram of a system configured to manage external hardware appliances from a distributed operating system in a computer network, in accordance with various embodiments.

Referring now to the drawings, in which like numerals represent like elements, various illustrative embodiments will now be described. FIG. 1 is a network architecture diagram of a computer network 100 that is configured to automatically target shared resources. In one embodiment, various components in the computer network 100 may be configured using a distributed operating system for web-based applications such as the operating system in SHAREPOINT services technology developed by MICROSOFT CORPORATION of Redmond, Wash. As is known to those skilled in the art, SHAREPOINT services technology enables users to create, maintain, and present a collaborative environment to share information. Using the technology, a user or organization can create one or more websites to provide and share information (e.g., documents on a web server or web folder, etc.) for other users associated with the websites. It should be understood that the embodiments described herein should not be construed as being limited to SHAREPOINT services technology and that other collaborative services technology from other developers and/or manufacturers may also be utilized. The computer network 100 and its components include functionality to communicate with other computing devices, communication devices, and/or other systems and are not intended to be limited to the embodiments and examples described herein.

As shown in FIG. 1, the computer network 100 includes, without limitation, a backend server 101, application servers 102A and 102B, and front end servers (i.e., web servers) 112A, 112B, and 112C, which are in communication with external hardware appliances including a domain name system ("DNS") server 114, a network load balancer 116, and a proxy server (i.e., firewall) 118. It will be appreciated that in accordance with various embodiments, other external hardware appliances may also be incorporated into the network 100 including a directory server for storing directories such as a Universal Description, Discovery and Integration ("UDDI") directory or a Lightweight Directory Access Protocol ("LDAP") directory, or the ACTIVE DIRECTORY service from MICROSOFT CORPORATION of Redmond, Wash. Other external hardware appliances which may be incorporated into the network 100 may include a mail server (such as a Simple Mail Transfer Protocol ("SMTP") server). In one embodiment, the backend server 101, the application servers 102A and 102B, and the front end servers 112A, 112B, and 112C may be configured as a distributed operating system utilizing SHAREPOINT services technology to create a collaborative environment for sharing information. In particular, in accordance with one embodiment, the application servers 102A and 102B may be configured to run the WINDOWS SERVER operating systems incorporating WINDOWS SHAREPOINT SERVICES technology from MICROSOFT CORPORATION of Redmond, Wash. It should be appreciated, however, that operating systems from other manufacturers may also be utilized to embody the various aspects of the technical features discussed herein.

The backend server 101 is in communication with the application servers 102A and 102B and the front end servers 112A, 112B, and 112C (via a firewall 110). In accordance with an embodiment, the backend server 101 may comprise a structured query language ("SQL") database which stores client data, settings, and connections between the front end servers 112A, 112B, and 112C and the application servers 102A and 102B in the network 100.

The application servers 102A and 102B are in communication with the backend server 101 and with the front end servers 112A, 112B, and 112C (through the firewall 110). Generally, the application servers 102A and 102B may be utilized for performing search indexing operations as well as communicating information from an active directory for exposure in a website hosted by the front end servers 112A, 112B, and 112C. The application servers 102A and 102B may include, without limitation, network management applications and driver models 104A and 104B (hereinafter referred to as network management applications 104A and 104B).

In accordance with one embodiment, the network management applications 104A and 104B may include driver models associated with the external hardware devices 114, 116, and 118. For example, a DNS driver model may be associated with the DNS server 114 and a load balancer driver model may be associated with the network load balancer 116. The driver models may be utilized by a system administrator to communicate with and configure settings in vendor supplied device drivers 130A, 130B, and 130C which may be installed in the front end servers 112A, 112B, and 112C. The driver models may be selected from a user interface generated by the network management applications 104A and 104B. In particular, the network management applications 104A and 104B may be configured to generate a central administration website comprising a hardware appliances hyperlink which a network administrator may select to access a driver model associated with an external hardware appliance. The network management applications 104A and 104B may also be configured to utilize the driver models to perform a network configuration operation utilizing the external hardware appliances 114, 116, and 118 from the central administration website such as adding or deleting a front end server in the network 100. The network management applications 104A and 104B may also be configured to utilize the driver models to perform a system status check to obtain a current status of the external hardware appliances 114, 116, and 118 from the central administration website. It should be understood that, in accordance with one embodiment, the driver models may be generic and configured to communicate with and manage settings in a number of device drivers comprising having common settings. Alternatively, the driver models may be vendor specific and configured to only communicate with and manage settings in a specific device driver from a vendor.

In accordance with one embodiment, the device drivers 130A, 130B, and 130C may utilize a set of application program interfaces ("APIs"), such as APIs 125A, 125B, and 125C on the front end servers 112A, 112B, and 112C, to communicate with the driver models for the external hardware appliance device drivers 130A, 130B, and 130C in the network 100. In particular, an extensible list of APIs in the distributed operating system may be shared with an external hardware appliance vendor so that a device driver may be developed to expose driver settings in the user interface generated by the network management applications 104A and 104B to manage external hardware appliances using the driver models. The functionality of the network management applications 104A and 104B in managing external hardware appliances in the network 100 will be described in greater detail below with respect to FIGS. 3-5.

The front end servers 112A, 112B, and 112C are in communication with the backend server 101 and the application servers 102A and 102B via the firewall 110. The web front end servers 112A, 112B, and 112C are also in communication with the external hardware appliances 114, 116, and 118 (i.e., the DNS server 114, the network load balancer 116, and the proxy server 118). The front end servers 112A, 112B, and 112C may include, without limitation, the APIs 125A, 125B, and 125C and the device drivers 130A, 130B, and 130C.

The DNS server 114 is in communication with the front end servers 112A, 112B, and 112C and may be configured to translate domain names (e.g., www.ITweb.com) into IP addresses (e.g., 198.105.232.4). The network load balancer 116 is also in communication with the front end servers 112A, 112B, and 112C and may be configured to load balance network traffic across a number of servers and automatically redistribute traffic to operational servers. The proxy server 118 is also in communication with the front end servers 112A, 112B, and 112C and may be configured as a firewall to filter requests from networked client computers (not shown).

Exemplary Operating Environment

Figure 2:
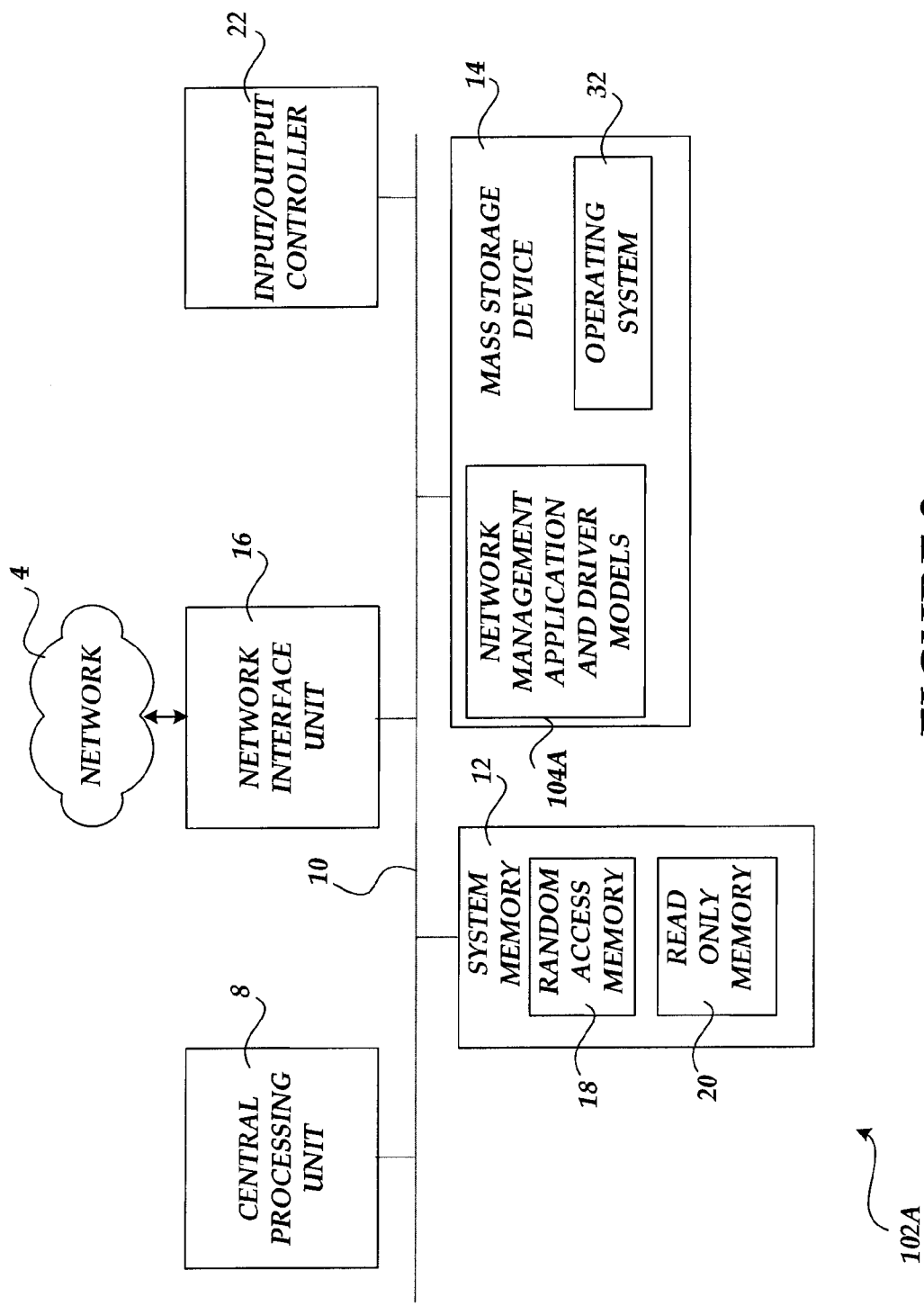
FIG. 2 is a block diagram illustrating a computing environment for implementing various embodiments described herein.

Referring now to FIG. 2, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 2, an illustrative operating environment for embodiments of the invention will be described. As shown in FIG. 2, the application server 102A comprises a server computer which may include a general purpose desktop, laptop, handheld, tablet, or other type of computer capable of executing one or more application programs. The application server 102A includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The application server 102A further includes a mass storage device 14 for storing an operating system 32 and the network management application 104A. In accordance with various embodiments, the operating system 32 may comprise the WINDOWS SERVER operating systems incorporating WINDOWS SHAREPOINT SERVICES technology. The mass storage device 14 is connected to the CPU 8 through a mass storage controller (not shown) connected to the bus 10. The mass storage device 14 and its associated computer-readable media provide non-volatile storage for the shared resources portal 110. Although the description of computer-readable media contained herein refers to a mass storage device, such as a hard disk or CD-ROM drive, it should be appreciated by those skilled in the art that computer-readable media can be any available media that can be accessed or utilized by the application server 102A.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the application server 102A.

According to various embodiments of the invention, the application server 102A may operate in a networked environment using logical connections to remote computers through a network 4, such as a local network or a wide area network (e.g., the Internet), for example. The application server 102A may connect to the network 4 through a network interface unit 16 connected to the bus 10.

It should be appreciated that the network interface unit 16 may also be utilized to connect to other types of networks and remote computing systems. The application server 102A may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the application server 102A, including an operating system 32 suitable for controlling the operation of a networked personal computer, such as the WINDOWS SERVER operating systems from MICROSOFT CORPORATION of Redmond, Wash. The mass storage device 14 and RAM 18 may also store one or more program modules. In particular, the mass storage device 14 and the RAM 18 may store the network management application 104A.

Figure 3:
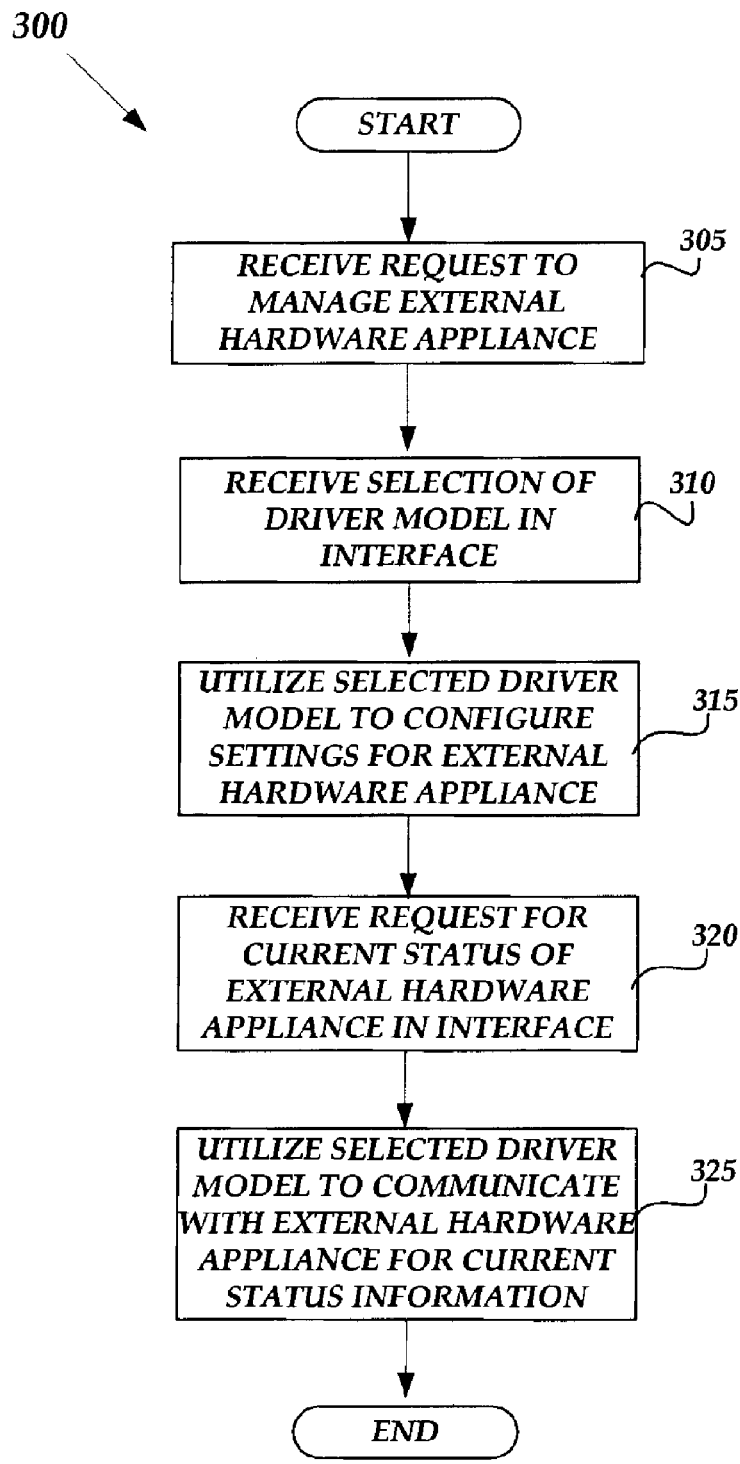
FIG. 3 is a flow diagram illustrating a routine for managing external hardware appliances from a distributed operating system interface in a computer network, in accordance with one embodiment.

FIG. 3 is a flow diagram illustrating a routine 300 for managing external hardware appliances from a distributed operating system interface in a computer network, in accordance with one embodiment. The components of FIGS. 1 and 2 are referred to in the description of FIG. 3, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3-4 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Figure 5:
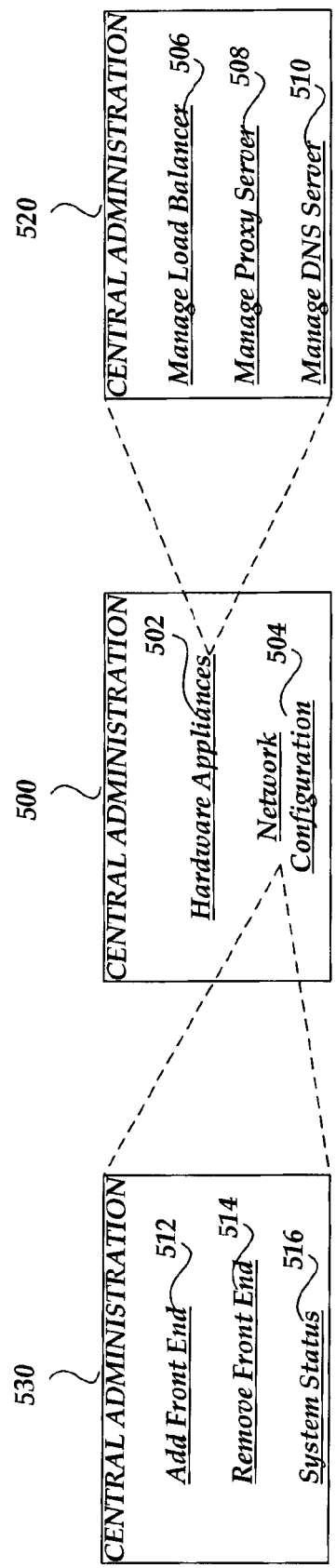
FIG. 5 is a block diagram of an illustrative user interface for a distributed operating system which may be utilized for managing external hardware appliances in a computer network, in accordance with one embodiment.

The routine 300 begins at operation 305, where either of the network management applications 104A or 104B executing on the application servers 102A or 102B (hereinafter referred to as the network management application 104A and the application server 102A) receives a request to manage an external hardware appliance in the network 100. In particular, a system administrator may access a web-based user interface generated by the network management application 104A and select a uniform resource locator ("URL") for managing driver settings for external hardware appliances. An illustrative user interface for managing external hardware appliances is shown in FIG. 5 and will be discussed in greater detail below.

From operation 305, the routine 300 continues to operation 310, where the network administration application 104A receives a selection of a driver model in the user interface. In one embodiment, the selection of the driver model may be made by selecting a URL corresponding to the external hardware appliance device driver to be configured. For example, a system administrator, after selecting a URL for managing external hardware appliances may be presented with a web page listing external hardware appliance types to configure and then select a URL corresponding to managing a load balancer. As discussed above, the driver model may be a generic driver model compatible with a number of external hardware appliance device drivers or alternatively, the driver model may be a vendor specific driver model which is compatible with a specific device driver from a vendor.

From operation 310, the routine 300 continues to operation 315, where the network administration application 104A utilizes the selected driver model to configure settings for the corresponding external hardware appliance. In particular, the network administration application 104A, after receiving the selected driver model, may open up a configuration wizard for configuring various settings associated with an external hardware appliance.

From operation 315, the routine 300 continues to operation 320, where the network administration application 104A receives a request for a current status of an external hardware appliance in the network 100. In particular, a system administrator may select a URL from the user interface generated by the network administration application 104A corresponding to a driver model to obtain a current status for an external hardware appliance in the network 100.

From operation 320, the routine 300 continues to operation 325, where the network administration application 104A utilizes the selected device driver to communicate with a corresponding external hardware appliance for current status information. For example, if requests for a website on a front end server in the network 100 unexpectedly return an error message, the system administrator may select a URL for the device status of a DNS server in the network 100. The routine 300 then ends.

Figure 4:
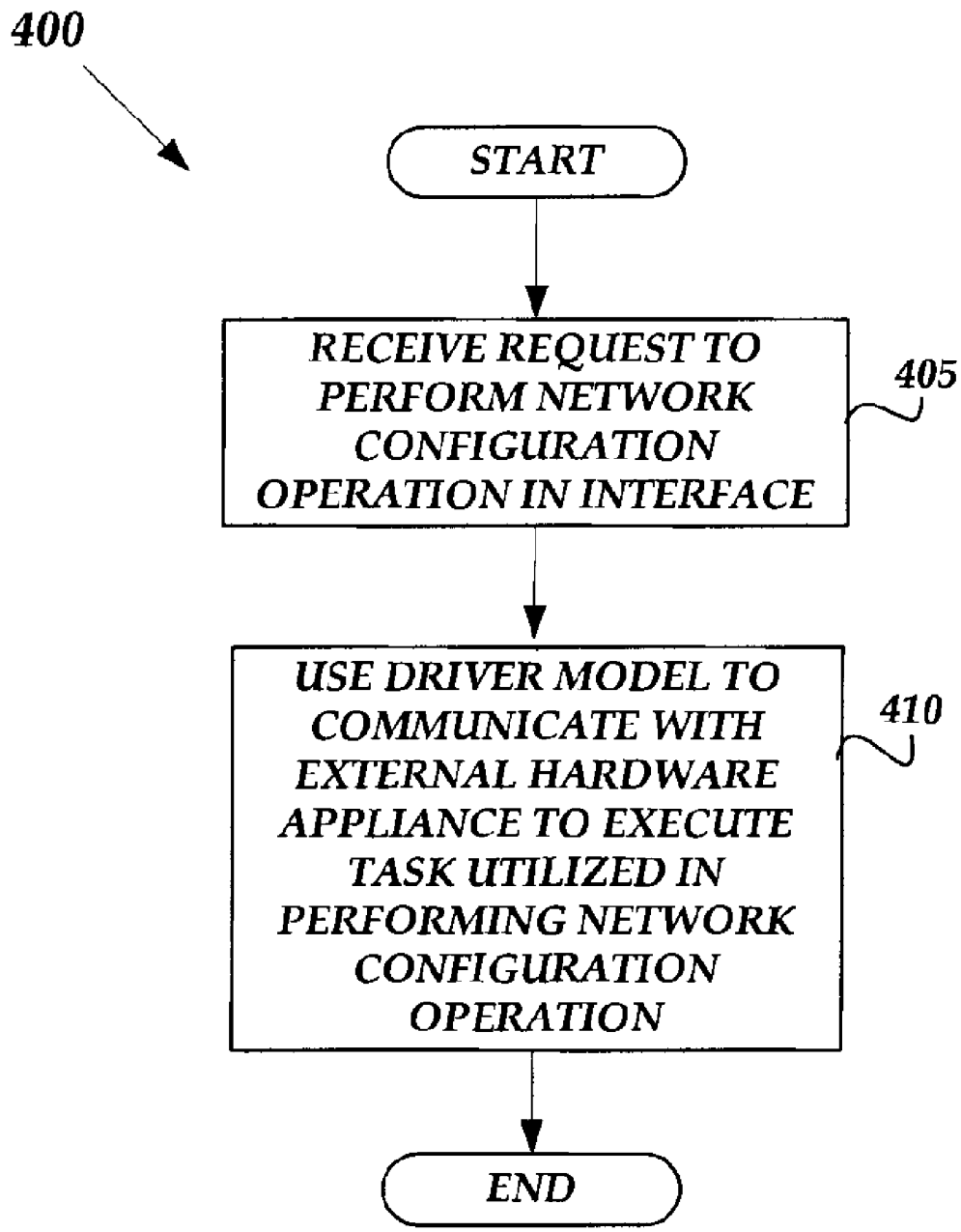
FIG. 4 is a flow diagram illustrating a routine for managing external hardware appliances from a distributed operating system interface in a computer network, in accordance with an alternative embodiment.

Turning now to FIG. 4, a routine 400 for managing external hardware appliances from a distributed operating system interface in a computer network, in accordance with an alternative embodiment, will now be described. The routine 400 begins at operation 405, where the network administration application 104A receives a request to perform a network configuration operation in the user interface. For example, a system administrator may select a URL in the user interface to add a front end server to the distributed operating system in the network 100.

From operation 405, the routine 400 continues to operation 410, where the network administration application 104A uses a driver model to communicate with an external hardware appliance to execute a task utilized in performing the requested network configuration operation. In particular, the network administration application 104A may be configured to automatically determine the tasks which need to be performed by the external hardware appliances in performing the requested network configuration operation and automatically utilize the driver models to communicate the appropriate settings to the affected external hardware appliance device drivers. For example, if a front end server is being added to a network, the network administration application 104A may determine that the settings for the network load balancer 116 need to be adjusted to handle the increased traffic from the new server. After the determination is made, the network administration application 104A may then automatically utilize the driver model for the network load balancer 116 to communicate with the network load balancer device driver 140 and instruct the device driver to adjust the necessary settings. The routine 400 then ends.

Turning now to FIG. 5, a block diagram of an illustrative user interface for a distributed operating system which may be utilized for managing external hardware appliances in a computer network, in accordance with an embodiment, will now be described. A user interface 500 comprises a central administration web page which includes a URL 502 for managing hardware appliances and a URL 504 for network configuration. Upon selecting the URL 502, a user (such as a system administrator) is taken to a web page 520 which includes a URL 506 for managing a load balance, a URL 508 for managing a proxy server, and a URL 510 for managing a DNS server. Upon selecting the URL 504, a user is taken to a web page 530 which includes a URL 512 for adding a front end server, a URL 514 for removing a front end server, and a URL 516 for requesting a system status of a network.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of managing external hardware appliances from a distributed operating system interface in a computer network, comprising:
   receiving a request in the distributed operating system interface to manage an external hardware appliance in the computer network;
   receiving a selection of a driver model associated with the external hardware appliance in the distributed operating system interface;
   automatically determining tasks for the external hardware appliance to fulfill the request to manage the external hardware appliance, the request comprising a configuration operation associated with an internal hardware appliance in the computer network, the tasks comprising configuring settings for the external hardware appliance to facilitate the configuration operation associated with the internal hardware appliance; and
   utilizing the selected driver model to configure the settings for the external hardware appliance from the distributed operating system interface, wherein utilizing the selected driver model to configure the settings for the external hardware appliance comprises:
   communicating the settings to at least one device driver for the external hardware appliance; and
   instructing the at least one device driver to adjust the settings to facilitate the configuration operation associated with the internal hardware appliance;
   wherein receiving a request in the distributed operating system interface to manage an external hardware appliance in the computer network comprises receiving a request in a web-based interface;
   wherein receiving a request in a web-based interface comprises receiving a selection of a Uniform Resource Locator (URL) for managing a plurality of external hardware appliances.

2. The method of claim 1 further comprising:
   receiving a request for a current status of the external hardware appliance from the distributed operating system interface; and
   in response to the request, utilizing the selected driver model to communicate with the external hardware appliance for current status information.

3. The method of claim 1, wherein receiving a request in the distributed operating system interface to manage an external hardware appliance in the computer network comprises receiving a request in the distributed operating system interface to manage at least one of the following: a proxy server, a load balancer, or a domain name system (DNS) server.

4. The method of claim 1, wherein receiving a selection of a driver model associated with the external hardware appliance in the distributed operating system interface comprises receiving a selection of a generic driver model, wherein the generic driver model utilizes a set of application program interfaces (APIs) to communicate with a plurality of device drivers used for managing a plurality of external hardware appliances.

5. The method of claim 1, wherein receiving a selection of a driver model associated with the external hardware appliance in the distributed operating system interface comprises receiving a selection of a vendor specific driver model, wherein the vendor specific driver model communicates with a vendor specific device driver used for managing the external hardware appliance.

6. A system for managing external hardware appliances from a distributed operating system interface in a computer network, comprising:
   a memory for storing executable program code; and
   a processor, functionally coupled to the memory, the processor being responsive to computer-executable instructions contained in the program code and operative to receive a request in the distributed operating system interface to perform a configuration operation associated with an internal hardware appliance in the computer network;
   to automatically determine a task for at least one external hardware appliance to fulfill the request to perform the configuration operation associated with the internal hardware appliance in the computer network, the task comprising configuring settings for the at least one external hardware appliance to facilitate the configuration operation associated with the internal hardware appliance;
   to communicate with at least one external hardware appliance to execute the task to facilitate configuration operation using a driver model associated with the at least one external hardware appliance, wherein the processor, in communicating with the at least one external hardware device is operative to communicate the settings to at least one device driver for the at least one external hardware device, wherein the settings are utilized to execute the task to facilitate the configuration operation associated with the internal hardware appliance; and
   to instruct the at least one device driver to adjust the settings to facilitate the configuration operation associated with the internal hardware appliance;
   wherein receiving a request in the distributed operating system interface to manage an external hardware appliance in the computer network comprises receiving a request in a web-based interface;
   wherein receiving a request in a web-based interface comprises receiving a selection of a Uniform Resource Locator (URL) for managing a plurality of external hardware appliances.

7. The system of claim 6, wherein the processor in receiving a request to perform a configuration operation in the distributed operating system interface is operative to receive a request to schedule the performance of the configuration operation.

8. The system of claim 6, wherein the processor in receiving a request to perform a configuration operation in the distributed operating system interface is operative to receive a request to add a front end server to the computer network.

9. The system of claim 6, wherein the processor in receiving a request to perform a configuration operation in the distributed operating system interface is operative to receive a request to remove a front end server from the computer network.

10. The system of claim 6, wherein the processor in receiving a request to perform a configuration operation in the distributed operating system interface is operative to receive a request to perform a configuration operation in a web-based interface.

11. The system of claim 6, wherein the processor in communicating with at least one external hardware appliance to execute a task utilized in performing the configuration operation using a driver model is further operative to utilize a generic driver model to communicate with the at least one device driver, wherein the at least one device driver is used for managing the at least one external hardware appliance.

12. The system of claim 6, wherein the processor in communicating with at least one external hardware appliance to execute a task utilized in performing the configuration operation using a driver model is further operative to utilize a vendor specific driver model to communicate with at least one vendor specific device driver used for managing the at least one external hardware appliance.

13. A computer-readable storage medium containing computer executable instructions which, when executed on a computer, will cause the computer to perform a method of managing external hardware appliances from a distributed operating system interface in a computer network, comprising:
   receiving a request in the distributed operating system interface to manage an external hardware appliance in the computer network;
   receiving a selection of a driver model associated with the external hardware appliance in the distributed operating system interface;
   automatically determining tasks for the external hardware appliance to fulfill the request to manage the external hardware appliance, the request comprising a configuration operation associated with an internal hardware appliance in the computer network, the tasks comprising configuring settings for the external hardware appliance to facilitate the configuration operation associated with the internal hardware appliance;
   utilizing the selected driver model to configure the settings for the external hardware appliance from the distributed operating system interface, wherein utilizing the selected driver model to configure the settings for the external hardware appliance comprises:
   communicating the settings to at least one device driver for the external hardware appliance; and
   instructing the at least one device driver to adjust the settings to facilitate the configuration operation associated with the internal hardware appliance;
   receiving a request for a current status of the external hardware appliance from the distributed operating system interface; and
   in response to the request, utilizing the selected driver model to communicate with the external hardware appliance for current status information;
   wherein receiving a request in the distributed operating system interface to manage an external hardware appliance in the computer network comprises receiving a request in a web-based interface;

wherein receiving a request in a web-based interface comprises receiving a selection of a Uniform Resource Locator (URL) for managing a plurality of external hardware appliances.

14. The computer-readable storage medium of claim 13, wherein receiving a request in the distributed operating system interface to manage an external hardware appliance in the computer network comprises receiving a request in the distributed operating system interface to manage at least one of the following: a proxy server, a load balancer, or a domain name system (DNS) server.

15. The computer-readable storage medium of claim 13, wherein receiving a selection of a driver model associated with the external hardware appliance in the distributed operating system interface comprises receiving a selection of a generic driver model, wherein the generic driver model utilizes a set of application program interfaces (APIs) to communicate with a plurality of device drivers used for managing a plurality of external hardware appliances.

16. The computer-readable storage medium of claim 13, wherein receiving a selection of a driver model associated with the external hardware appliance in the distributed operating system interface comprises receiving a selection of a vendor specific driver model, wherein the vendor specific driver model communicates with a vendor specific device driver used for managing the external hardware appliance.

* * * * *